US008219466B2

(12) United States Patent
Gui et al.

(10) Patent No.: US 8,219,466 B2
(45) Date of Patent: Jul. 10, 2012

(54) SYSTEM AND METHOD FOR PROVIDING ASSET MANAGEMENT AND TRACKING CAPABILITIES

(76) Inventors: John Yupeng Gui, Niskayuna, NY (US); John William Carbone, Niskayuna, NY (US); Joseph Salvo, Schenectady, NY (US)

( * ) Notice: Subject to any disclaimer, the term of this patent is extended or adjusted under 35 U.S.C. 154(b) by 1603 days.

(21) Appl. No.: 10/065,865

(22) Filed: Nov. 26, 2002

(65) Prior Publication Data

US 2004/0024644 A1 Feb. 5, 2004

Related U.S. Application Data

(63) Continuation-in-part of application No. 10/064,665, filed on Aug. 5, 2002.

(51) Int. Cl.
*G06Q 10/00* (2012.01)
(52) U.S. Cl. ........................................ 705/28
(58) Field of Classification Search .................. 705/26, 705/64
See application file for complete search history.

(56) References Cited

U.S. PATENT DOCUMENTS

| | | | |
|---|---|---|---|
| 4,525,713 A | 6/1985 | Barletta et al. | |
| 5,434,775 A | 7/1995 | Sims et al. | |
| 5,689,238 A | 11/1997 | Cannon, Jr. et al. | |
| 5,774,876 A | 6/1998 | Woolley et al. | |
| 5,963,134 A | 10/1999 | Bowers et al. | |
| 5,971,592 A | 10/1999 | Kralj et al. | |
| 6,094,642 A | 7/2000 | Stephenson et al. | |
| 6,148,291 A * | 11/2000 | Radican | 705/28 |
| 6,286,762 B1 | 9/2001 | Reynolds et al. | |
| 6,286,763 B1 | 9/2001 | Reynolds et al. | |
| 6,304,881 B1 | 10/2001 | Halim et al. | |
| 6,344,794 B1 * | 2/2002 | Ulrich et al. | 340/539.16 |
| 6,996,538 B2 * | 2/2006 | Lucas | 705/28 |
| 7,216,109 B1 * | 5/2007 | Donner | 705/64 |
| 2002/0111884 A1 * | 8/2002 | Groat et al. | 705/28 |
| 2002/0143643 A1 * | 10/2002 | Catan | 705/26 |
| 2003/0120745 A1 * | 6/2003 | Katagishi et al. | 709/217 |
| 2003/0227382 A1 * | 12/2003 | Breed | 340/539.13 |

OTHER PUBLICATIONS

Dialog search history.*

* cited by examiner

*Primary Examiner* — Russell S Glass
(74) *Attorney, Agent, or Firm* — Richard A. DeCristofaro

(57) ABSTRACT

A comprehensive method and system is provided for managing bulk and non-bulk material and assets using radio frequency and other asset identification devices, distributed mobile computing systems, centralized data storage environments, and client-server based computing. In particular, a process has been designed and to manage shipment items from businesses and third parties to customer designated locations. Components of this system include electronic asset identification devices, a central data repository, a mobile computing environment and associated software applications supporting a client-server system or n-tiered computer system. The mobile computing environment includes software which enables users to physically locate assets, view asset information, and modify such information to reflect current asset status. This information may then be exchanged and synchronized across the n-tiered computer system. Additionally, various personnel associated with the shipping arrangement may have access to the available information over a computer network such as the Internet. In this manner, such personnel can easily determine the status of various shipments and also promptly act on information collected during any status updates, thereby expediting the resolution of any potential exceptions which may arise. The electronic asset identification devices may be further configured to include various types of sensors. The devices may then operate to process and store sensor output information for subsequent relay to users via the mobile computing environment or other means.

42 Claims, 12 Drawing Sheets

SYSTEM AND METHOD FOR PROVIDING ASSET MANAGEMENT AND TRACKING CAPABILITIES

CROSS REFERENCE TO RELATED APPLICATIONS

The present application claims priority to co-pending U.S. patent application Ser. No. 10/064,665, filed Aug. 5, 2002, the entirety of which is incorporated by reference herein.

BACKGROUND OF THE INVENTION

The present invention relates generally to systems and methods for managing the flow of physical assets between various entities. More particularly, the present invention relates to methods and systems which utilize various computer technologies to create and maintain an up-to-date record of asset status and location information which may then be shared among various personnel.

Maintaining an accurate and current record of shipment deliveries and status information has long been an area of significant frustration for businesses that ship large numbers of products or materials to a variety of customer locations. Conventionally, such shipping and delivery record keeping involved following a paper trail relating to the shipment and delivery of the particular item in question. Unfortunately, much of the paperwork required to maintain the accuracy of the record, is often either missing, late, or erroneously completed. Additionally, information regarding the status of the delivered items is typically not included in such information.

One method for enhancing the ability of shippers to maintain accurate records, involves the placement of unique computer-readable identification codes, e.g., bar codes, on each product shipment. By scanning in these codes at various waypoints during delivery, a record of the shipment process may be maintained. This information may then be forwarded to a shared database for subsequent access by authorized parties. Unfortunately, this process requires the affirmative step of locating and scanning in each identification code in a timely manner. Further, this process does not assist product recipients in determining the location and status of their received deliveries.

Alternatively, container tracking methodologies have been developed which monitor shipments more automatically and continuously. Such systems may utilize sophisticated GPS (Global Positioning Satellite) systems as well as other electronic technology to obtain real-time data on in-transit locations. In addition to such shipment tracking systems, systems are also in place which enable monitoring and management of the various inventory systems. Armed with accurate and up-to-date information, inventory management systems allow businesses to easily determine the extent of their inventories. Unfortunately, such real-time systems are often prohibitively expensive to implement, particularly where large numbers of items are included in each shipment. Further, as with the code scanning systems described above, these methods likewise fail to provide information regarding the status of the delivered goods.

For example, in a typical sale and shipment of goods transaction, a carrier may know from a satellite tracking system that a container has reached a factory or job site, but does not know if the container included damaged goods or otherwise unacceptable goods. Further, although the shipment has in fact been received, this knowledge is limited to the carrier and the personnel actually receiving the shipment. Additional personnel also having need of this knowledge are unaware of the delivery.

In addition to the relatively simple scenarios laid out above, certain additional circumstances may also exist which require accurate knowledge of both shipment location and status information in a timely manner. For example, there exist circumstances in which a supplier is required to deliver material purchased under a purchase agreement to customer designated sites at specified times. To fulfill these contractual obligations the supplier manufactures and ships or purchases through third parties material necessary for the fulfillment of the contracts. In these instances it is imperative that the supplier maintain a logistics organization capable of coordinating the shipment of material from themselves and the various third party vendors so as to avoid a failure to meet their contractual obligations. This logistics activity requires the timely tracking of materials from point of shipment to destination. Additionally, detailed information regarding the material subsequent to its delivery is also required for providing expedited remedies to any delivery exceptions which may arise. This information may include such items as material description, quantity, vendor, purchasing information, and the like.

To address these known problems, past attempts have utilized radio frequency identification (RFID) devices to track retail goods for asset security. A secondary use of such RFID devices has been for the near-real time tracking of material location. These RFID devices have been tracked using both fixed 'reader' systems, wherein a reader identifies devices within a predetermined proximity to the reader. Additionally, man-portable RFID reading hardware has also been utilized, wherein the reader may be physically moved through a plurality of assets having RFID tags affixed thereto, for example, in a laydown yard or warehouse, or within range of such tagged assets. Unfortunately, existing solutions have failed to provide a sufficiently robust and cost-effect solution to the above problems.

In addition to the inability of conventional asset management systems to provide sufficiently robust and cost-effect solutions to the tracking of asset location, conventional systems also fail to provide asset condition information regarding physical and environmental conditions experienced by the assets during both shipment and operation.

Accordingly, there is a need in the art of asset management and tracking systems for an asset management system for enabling the robust monitoring of asset operating and environmental conditions tracking of materials in an automated and cost-effective fashion from its point of shipment to its point of delivery. Additionally, there is also a need for a method and system which, in addition to material shipment and tracking information, also provides more detailed information. Additionally, there is a need for a method and system for enabling the identification of specific materials among a plurality of materials. Further, there is a need for a method and system for enabling the monitoring and exchange of environment and operating condition information.

SUMMARY OF THE INVENTION

The present invention overcomes the problems noted above, and provides additional advantages, by providing a comprehensive method and system for managing bulk and non-bulk material and assets using radio frequency and other asset identification devices, distributed mobile computing systems, centralized data storage environments, and n-tiered based computing, such as client-server systems. In particular, a novel process has been designed to manage shipment items from businesses and third parties to customer designated locations. Components of this system include electronic asset identification devices, a central data repository, a mobile computing environment and associated software applications supporting a client-server or n-tiered computing system.

In accordance with one embodiment of the present invention, the various system components are electronically linked together to transmit and receive data associated with tracked asset material. Typical data tracked may include material identification information, a description of the material, purchasing details, storage and maintenance details, and material location and destination information.

In accordance with a second embodiment of the present invention, the central data repository is further electronically linked with a plurality of legacy database systems for maintaining the accuracy of information on such systems in view of the ascertained shipping information. In this manner, information is collected from various disparate systems and is synchronized together through interaction with the central data repository and mobile computing environments.

In accordance with another embodiment of the present invention, the mobile computer environment includes software which enables on-site users to physically locate asset material, view specific asset information, and modify this information to accurately reflect the current status of the asset. Further, the mobile computing environment may then be linked with the central data repository aver the n-tiered computing system to synchronize the data across all systems.

In accordance with yet another embodiment of the present invention, various personnel associated with the shipping arrangement may have access to the available information over a computer network such as the Internet. In this manner, such personnel can easily determine the status of various shipments and also promptly act on information collected during any status updates, thereby expediting the resolution of any potential exceptions that may arise.

In accordance with another embodiment of the present invention, electronic asset management devices may be further configured to include various types of sensors. These devices may then operate to process and store sensor output information for subsequent relay to users via the mobile computing environment or other means. Additionally, such intelligent sensing devices may be further utilized to independently relay environmental and operating conditions information in a wireless manner, thereby creating a virtual network of intelligent sensing devices, the outputs of which may be collectively analyzed.

BRIEF DESCRIPTION OF THE DRAWINGS

The present invention can be understood more completely by reading the following Detailed Description of Preferred Embodiments, in conjunction with the accompanying drawings.

DETAILED DESCRIPTION OF THE PREFERRED EMBODIMENTS

Figure 1:
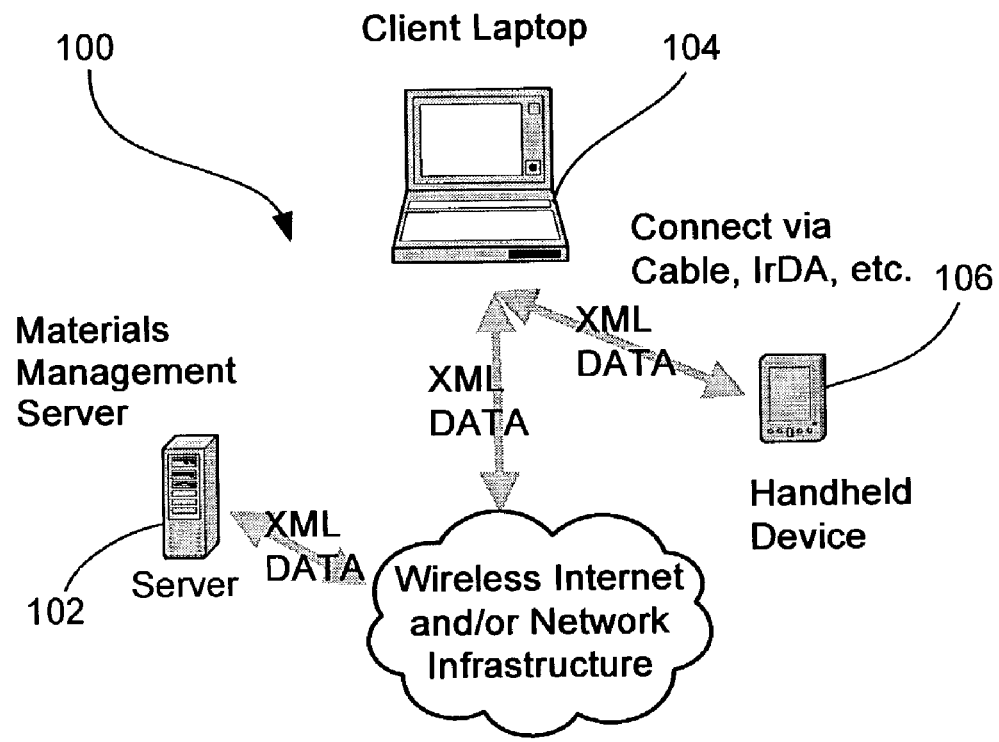
FIG. 1 is a generalized block diagram illustrating an asset and materials management system configured in accordance with one embodiment of the present invention.

Referring now to the Figures and, more particularly, to FIG. 1, there is shown a generalized block diagram illustrating an asset and materials management system 100 configured in accordance with one embodiment of the present invention. In particular, at its most simplistic implementation, the inventive asset and materials management system 100 includes at least an asset management server computer system 102, a remote client computer system 104, and at least one interrogation device 106 (either handheld or fixed). In addition, each item or asset to be managed also includes an electronic asset identification device such as an RFID device (not shown).

During implementation of one embodiment of the present system, RFID devices, or tags, are affixed at the point of shipment to each asset (for example, crates, storage or packing containers, or the like) that is to be tracked. An electronic association is made between each RFID tag and the material being shipped which is then transmitted in an automated fashion to the asset management server computer system 102. As material moves from point of shipment to its destination, updates along its route and at site may be recorded automatically and remotely through the interrogation of the RFID devices either with fixed or mobile radio frequency interrogators (readers) 106 and association of these ID's with status events (e.g. at port, arrival at site, etc). This information is then typically shared with client computer system 104 and updates on the status or disposition of material may then be transmitted in a hard-wired or wireless mode back to the asset management server computer system 102. Detailed information related to the material being tracked may be obtained through querying a client-server type system or via a mobile computing device which both access the asset management server computer system 102.

One element of the present solution is the use of electronic asset identification devices such as RFID's to track asset material. These devices may be programmed prior to use or during use. Such programming may include association of the devices with an electronic identification code which may be alphanumeric in character. These devices are constructed to transmit this code as well as other information when requested from specifically designed RFID interrogators (readers). As briefly set forth above, these readers may be used in either a fixed or mobile environment. Once devices with electronically coded ID's are associated with material to be tracked other associated data may be tracked along with material shipment tracking data using a centralized or distributed data repository. This data when packaged in an organized fashion may be viewed and modified via mobile computing devices which also may be enabled to interact with the asset identification devices. These devices may then directly or indirectly synchronize these updates with the asset management server computer system 102 using either wireless or hard-wired communication systems.

In addition to viewing via the mobile computing devices, the present system also provides for the seamless viewing and modification of data associated with tracking, identification and use of material by additional client computer systems (not shown) electronically connected to the asst management server computer system via a computer network. Updates to material data may be viewed in a near-real time environment due to the connection of mobile computing systems to the asset management server computer system. The electronic asset identification devices provide for a remote, automated means for tracking and updating the status of material.

As will be described in additional detail below, a 'Materials Management' web application for interfacing with the above-described asset management information is accessible to designated personnel. Further, updates to the asset management server computer system may be accomplished through the use of a mobile handheld computing platform and specifically designed software package called 'TagDetect'.

The asset management server computer system 102 may be or include, for instance, a workstation running the Microsoft Windows™ NT™, Windows™ 2000, Windows™ XP™, Unix, Linux, Xenix, IBM AIX™, Hewlett-Packard UX™, Novell Netware™, Sun Microsystems Solaris™, OS/2™, BeOS™, Mach, Apache, OpenStep™ or other suitable operating system or platform. In operation, the asset management server computer system 102, executes at least one web server application conventionally known as an HTTPd server. In addition, the asset management server computer system 102 preferably provides local storage for at least one, though typically many, web pages as files in HTML format, XML (eXtensible Markup Language) format and/or other formats. Also, asset management server computer system 102 may include several individual server computers or database computers positioned at various locations on the network.

Client computer system 104 may include, for instance, a personal computer running the Microsoft Windows™ 95, 98, Millenium™, NT™, XP™, or 2000, Windows™ CE™, PalmOS™, Unix, Linux, Solaris™, OS/2™, BeOS™, MacOS™ or any other operating system or platform. Client computer system 104 may also include a microprocessor such as an Intel x86-based device, a Motorola 68K or PowerPC™ device, a MIPS, Hewlett-Packard Precision™, or Digital Equipment Corp (DEC) Alpha™ RISC processor, a microcontroller or other general or special purpose device operating under programmed control. Furthermore, client computer system 104 may include electronic memory such as RAM (random access memory) or EPROM (electronically programmable read only memory), storage devices such as a hard drive, CDROM or writable/rewritable CDROM, DVDROM or writeable/rewritable DVDROM or other magnetic, optical or other media, and other associated components connected over an electronic bus, as will be appreciated by persons skilled in the art. Client computer system 104 may also include a network-enabled appliance such as a WebTV™ unit, radio-enabled Palm™ Pilot or similar unit, a set-top box, a networkable game-playing console such as Sony Playstation™ or Playstation 2™, Microsoft X-Box™, Nintendo GameCube™, or Sega Dreamcast™, a browser-equipped cellular telephone, or other TCP/IP enabled client or other device.

The interrogation device 106 may include a handheld computer such as a Palm™ Pilot, Compaq iPAQ, Sony Clie, Handspring Visor, Research in Motion Blackberry, or similar device operating on the Windows CE or Palm OS operating systems to transmit and receive radio frequency signals to and from the electronic asset identification devices. Additionally, interrogation device 106 may also include a specialized stand-alone fixed reading device.

Suitable computer networks for use in conjunction with the present invention may include or interface with any one or more of, for instance, an local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.92, V.34 or V.34 bis analog modem connection, a cable modem, an ATM (Asynchronous Transfer Mode) connection, or an FDDI (Fiber Distributed Data Interface) or CDDI (Copper Distributed Data Interface) connection.

Furthermore, the computer network may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, an IEEE 802.11x-based radio frequency network, or an HPNA (Home Phoneline Networking Alliance) compliant ethernet network. Computer network may yet further include or interface with any one or more of an RS-232 serial connection, an IEEE-1394 (Firewire™) connection, a Fibre Channel connection, an IrDA (infrared) port, a SCSI (Small Computer Systems Interface) connection, a USB (Universal Serial Bus) connection or other wired or wireless, digital or analog interface or connection.

In general operation, the client computer system requests a web page by issuing a URL request through the network to the server system 102. A URL consistent with the present invention may be a simple URL of the form: <protocol_identifier>://<server_path>/<web_page_path> The protocol identifier http specifies the conventional hypertext transfer protocol, however other suitable protocol identifiers may be implemented. For example, a URL request for a secure network communication session typically utilizes the secure protocol identifier https, assuming that the client browser and web server each support and implement the secure sockets layer (SSL). The server_path is typically of the form prefix domain, where the prefix may be www to designate a web server and the domain is the standard network sub-domain. top-level-domain of the server system 106. The optional web_page_path is provided to specifically identify a particular hyper-text page maintained by the asset management server computer system 102.

In response to a received URL identifying an existing web page, the asset management server system 102 returns the web page, subject to the HTTP protocol, to the client computer system 104. This web page typically incorporates both textual and graphical information including embedded hyper-text links, commonly referred to as hyperlinks that permit the client user to readily select a next URL for issuance to the computer network. In this manner a plurality of individual web pages may be grouped into a comprehensive web site.

The URL issued from the client computer system 104 may also be of a complex form that identifies a common gateway interface (CGI) program on a server system 106. Such a HTML hyperlink reference may take the form: <form action=http://www.vendor.com/cgi-bin/logon.cgi method=post>A hypertext link of this form directs the execution of the logon.cgi program or script on the server system in response to a client-side selection of the associated hyperlink. A logon form supported by a logon CGI program is typically used to obtain a client user login name and password to initiate an authenticated session between the client browser and web server for purposes of supporting, for example, an exchange of secure or otherwise privileged information. Further, web site privileges may be managed by referencing the information received during such a logon request, thereby enabling the specific tailoring of the site to a unique individual or class of individuals.

Figure 2:
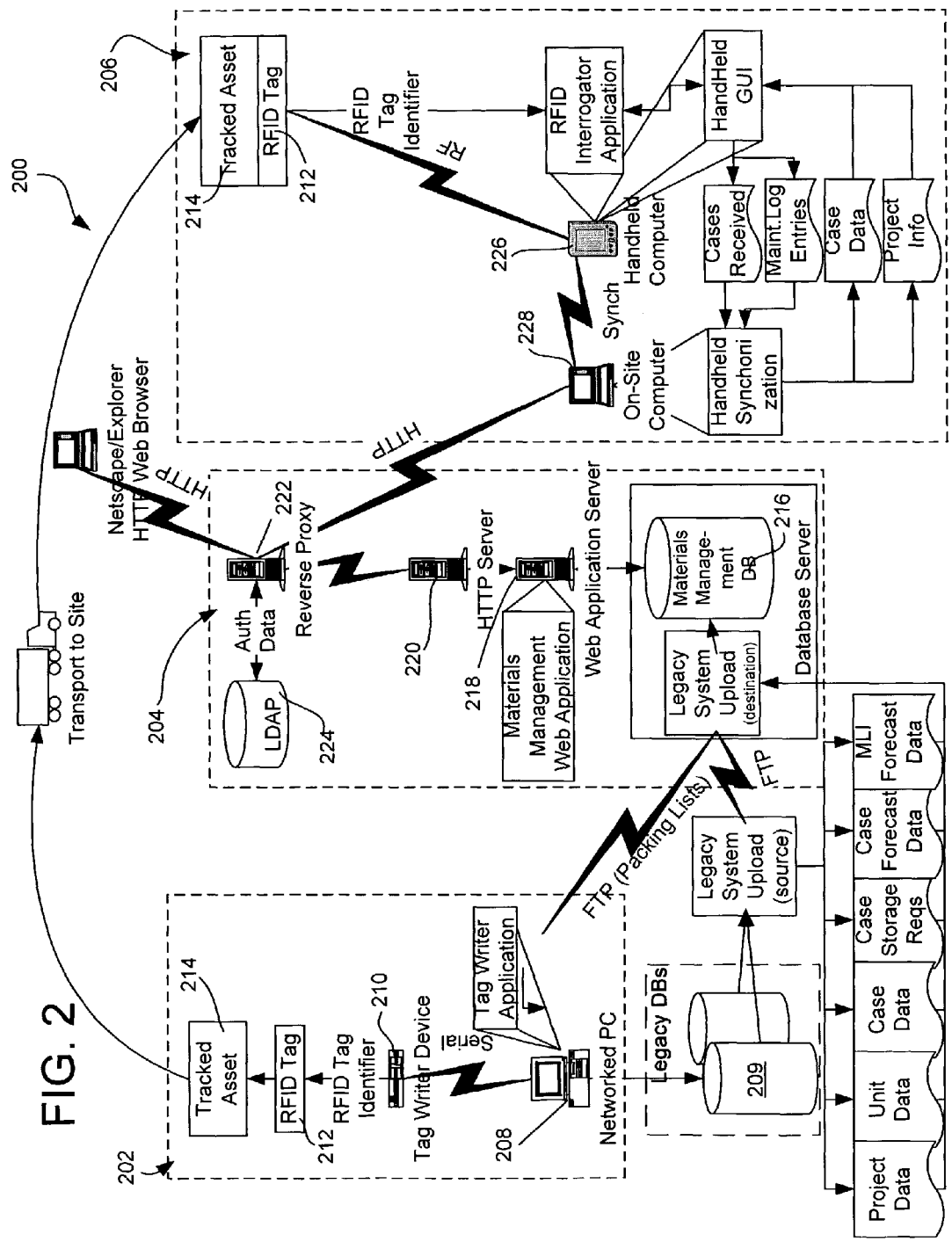
FIG. 2 is a block diagram illustrating a second, more specialized, embodiment of the asset management system of the present invention.

Referring now to FIG. 2, a block diagram illustrates a second, more specialized, embodiment 200 of the asset management system of the present invention. In particular, the asset management system of FIG. 2 includes 3 main areas: an initial asset information area 202; a web application area 204; and a project site area 206. Each of these areas play a role in the overall system and interact with each other through various computer network topologies.

Referring now specifically to the initial asset information area 202, a tagging computer system 208 is provided which includes at least RFID tag writing software for formatting RFID tags prior to placement on the various assets to be tracked. In one embodiment, this computer system 208 is preferably networked to existing legacy databases 209 for retrieving specific information regarding the various assets to incorporate within their respective RFID tags, such as the project information in which the asset is to be used, as well as other information regarding the asset in question, such as forecast information, storage requirements, etc. Further, in another embodiment, when a single tag is used to identify several shipped items, computer system 208 may also operate to transmit an electronic packing list both to the RFID tag as well as the web application area 204. Additional details regarding this embodiment will be set forth in additional detail below.

A tag writer device 210 is the operatively connected to the computer system 208 for writing the information formatted by the computer system 208 onto the RFID tag 212. This tag 212 is then secured to the associated asset 214 using any suitable means, such as adhesives or the like. Once the RFID tag 212 has been secured to the asset 214, the asset is placed then shipped to the site destination by any desired means. It should be understood that the initial asset information area encompasses both internal and third party shipping procedures. Of course, where the shipment originates from a third party, the connection to legacy databases may be different, depending upon how information included within the RFID tag is generated. Regardless, information regarding the RFID tag identification information and packing list data is exchanged with the web application area 204 for inclusion within that system. In one embodiment, data transfer between the initial asset information area 202 and the web application area 204 is accomplished via ftp (file transfer protocol) transfer.

As briefly described above, once information has been shared between the tag writing computer system 208 and the web application area 204, this information is made available for viewing and modification via a web application available over the Internet or other suitable computer network. Additionally, once data transfer between legacy database systems 209 and the web application area 204 has been accomplished specific information regarding the various tracked assets and the projects of which they are a part are also available over the computer network.

In the illustrated embodiment, the web application area 204 includes several elements. Initially, all RFID tag, asset and project information is received and stored within a materials management database system 216. This information is then made available to a web application server 218 and connected HTTP server 220 for dissemination over the computer network. As will be described in additional detail below, the web application and HTTP servers provide this information in a user-specific manner utilizing a plurality of interactive web pages. Further, it should be understood that the web application server's connection to the materials management database system 216 is bi-directional. That is, asset management information which is updated via the web application server, via the interactive web application either directly or by way of the handheld computing device described in detail below, is correspondingly written to the materials management database system, for subsequent retrieval by later users.

Optionally, as illustrated, the web application may also include an authentication server 222 with access to an LDAP directory system 224 for facilitation of login and authentication of users. In conjunction with such a system, different web application functionality may be afforded to different users, depending upon their login information.

Turning now to the project site area 206, interaction with site personnel enables up to date information regarding the tracked asset to be easily determined and uploaded to the web application and materials management database systems for review over the computer network. In particular, once the tracked asset 214 having the RFID 212 affixed thereto is received at the site, information regarding the asset may be uploaded to the web application area 204 by site personnel in a variety of ways, such as direct web entry and handheld synchronization. Initially, a handheld device 226, such as a device running the Windows CE or Palm OS operating systems, is provided with RFID tag reading capabilities, typically by adding both a hardware module and a corresponding software application. Utilizing the handheld device 226 and software application, asset handlers are able to either affirmatively read information from a located asset or locate an asset included within a plurality of tagged assets.

Once the asset has been located, additional information regarding the status of the asset may be entered into the handheld device application for future upload to the web application area 204. The entry of this information is simplified by the GUI on the device 226 which specifically enables input of various information, such as asset receipt, maintenance information, as well as other asset specific and project data. Additional details and specific embodiments of the handheld device application will be set forth in detail below, in reference to FIG. 5.

Next, during synchronization with a connected on-site computer system 228, information on the device 226 regarding the asset or assets located and updated is added and/or synchronized with information contained within the on-site computer system 228. In a preferred embodiment, this information is exchanged in the form of an XML file, for providing easy parsing of data included therein by the web application area 204 upon upload although additional data formats such as comma delimited (separated) values, or any other suitable data format.

Once information has been synchronized between the handheld device 226 and the on-site computer system 228, the information also needs to be synchronized between the on-site computer system 228 and the web application area 204. This process is completed upon login by the site personnel to the web application server system 218. Upon access and authentication by the authentication server 222, the user is provided with the option to synchronize their data with the web site. Accordingly, the information synchronized between the on-site computer system 228 and the handheld device 226 is uploaded to the web application server 218 and subsequently to the materials management database system 216 for both relay to legacy systems and viewing or modification via the web application. Additionally, as set forth briefly above, project site personnel may also have the option of directly entering asset status information into the web application without performing a synchronization. This enables site personnel without access to a suitable handheld device to also perform easy status updates. In addition, file exchange between the web application and the client computer or handheld device may also be encrypted using known encryption techniques such as public key encryption, message hashing, or the like so as to ensure that data transmitted therebetween is not intercepted by unauthorized parties.

In accordance with another embodiment of the present invention, different access to the web application is provided based upon the type of user logging in to the application. Types of users may include internal business administration personnel; on-site material handler personnel; exception resolution personnel; business personnel; on-site customer management personnel; and customer headquarters personnel. Differences between application access and privileges will be described for each of these types in additional detail below.

Figure 3:
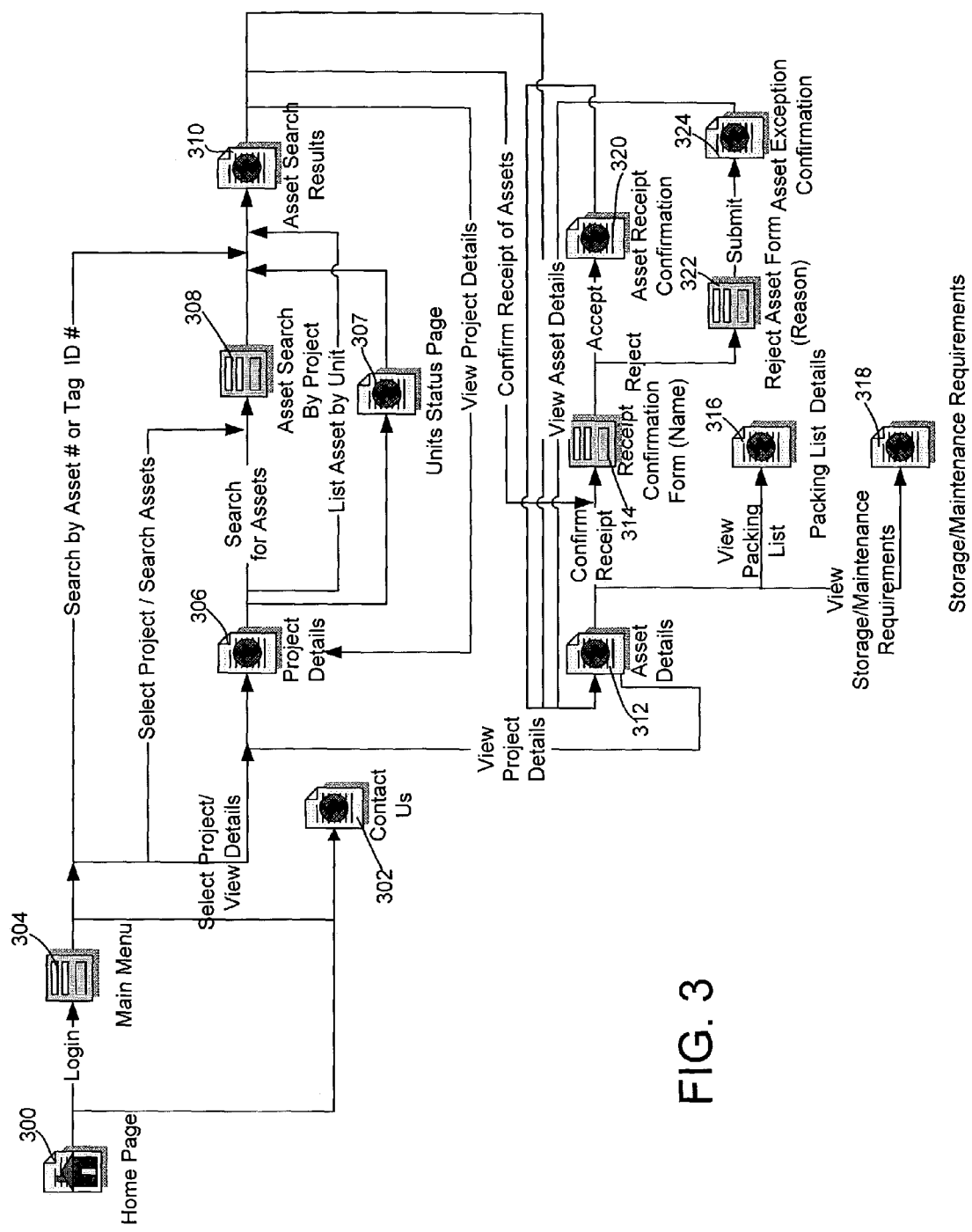
FIG. 3 is a flow diagram schematically illustrating one embodiment of a generalized method for sharing and accessing asset tracking information over a computer network such as the Internet.

Referring now to FIG. 3, there is shown a flow diagram schematically illustrating one embodiment of a generalized method for sharing and accessing asset tracking information over a computer network such as the Internet. In the diagram below, each step on the described process indicates a decision made by users visiting the website maintained by web application area 204, described in detail above. Initially, upon entry of a URL associated with the web application area's website, a home page 300 is displayed to the user. Prior to logging in to obtain access to specific asset information, users may select a plurality of administrative pages, such as a contact page 302 for facilitating communication with the website operators. Upon user login (which may be selected from either the home page or any of the administrative pages), a main menu 304 is displayed to the user which includes various options relating to the display and modification of asset management information. In accordance with an embodiment of the present invention, the web application area utilizes information provided during user login to determine the various options available to the users. In this manner, users are directed toward information that they are authorized to view.

Of the options provided to users, the present embodiment includes options to search records by both specific asset number as well as by project. Additionally, when viewing projects, users are given the option of whether to view the project details or search for assets within the project. It should be understood that projects relate to collections of assets regarding identified customer operations, e.g., a power plant generator, etc. For this example, the project may include a listing of all assets in the generator. Additionally, projects may also include a unit sub-category, wherein various units make up the project, with each unit having various assets.

In response to a user selection of a select project option, a project details page 306 is displayed. This page provides users with information regarding the project as well as options to search for assets in the project, list the project assets by unit, and view a unit status page 307. In response to a user selection of a search for project assets, either from the main menu 304 or from the project details page 306, an asset search form 308 is displayed to the user, wherein search criteria regarding the asset may be entered. In response to a submission of this form, an asset search results page 310 is displayed itemizing the various assets which match the submitted criteria.

From this point, users have three options, they may return to the project details page 306, view details for selected asset in page 312, or confirm or reject receipt of an identified asset in a form on page 314. Regarding the asset details page 312, once users have viewed the current details and status of the asset, they have the option of continuing to the asset receipt confirmation form 314 or viewing additional details associated with the asset, such as a packing list details page 316 or a storage/maintenance requirements page 318. Regarding the asset receipt confirmation or rejection form on page 314, users complete and submit the form indicating either receipt confirmation or rejection of the asset. If the asset has been received and accepted, a receipt confirmation page 320 is displayed. However, if an asset has been rejected, an asset rejection form 322 is displayed for enabling users to indicate the reason for the rejection, thereby creating an exception in the asset management system. Confirmation of this asset exception is then displayed to the user in page 324. Once the identified asset has been either accepted or rejected, the user may return to the asset details page 312 and from there, the user may return to the project details page 306 to select additional assets for review.

Figure 4:
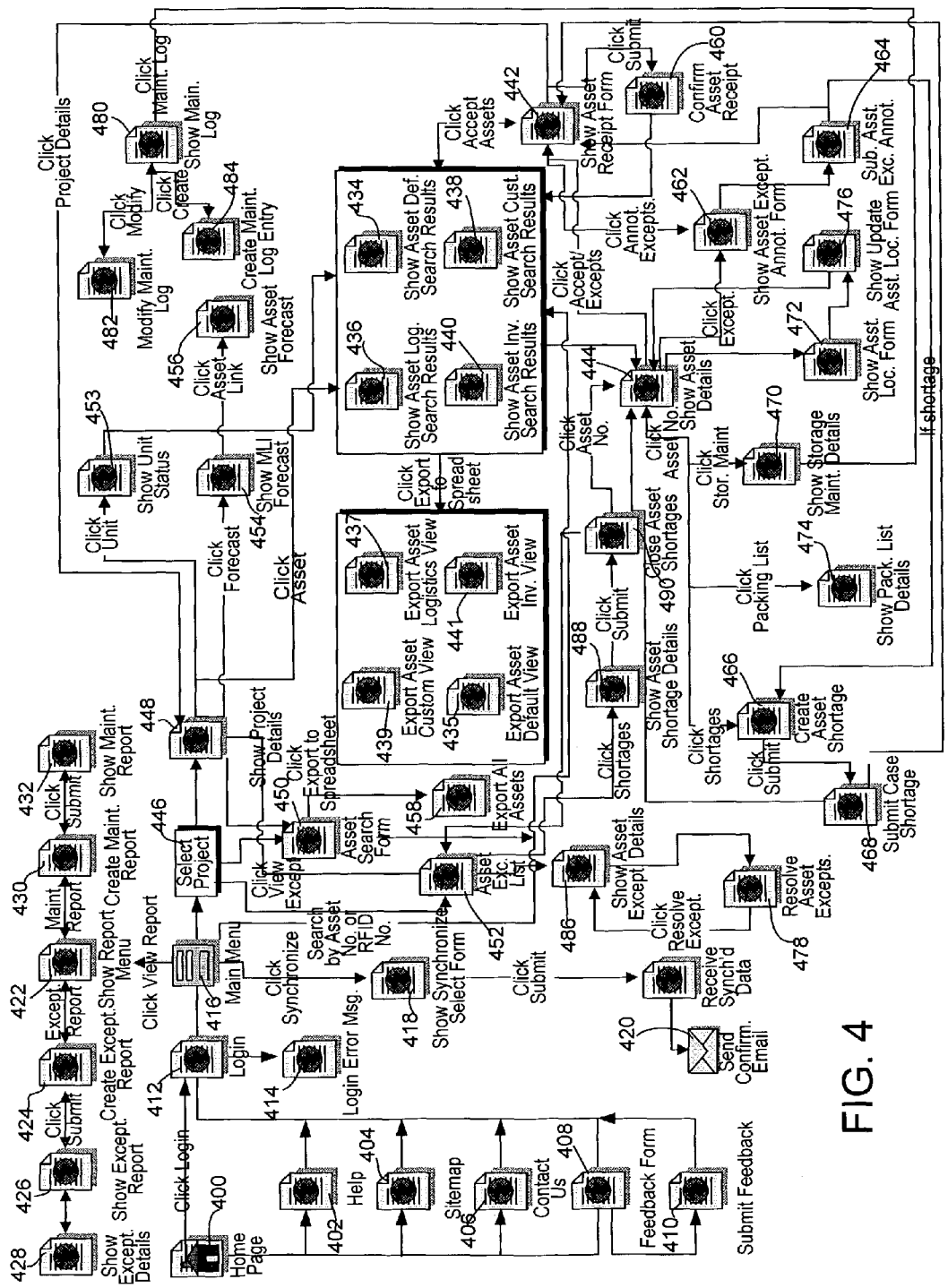
FIG. 4 is a flow diagram schematically illustrating one embodiment of a generalized method for sharing and accessing asset tracking information over a computer network such as the Internet specially configured for website administrative level personnel.

Referring now to FIG. 4, there is shown a flow diagram schematically illustrating an additional embodiment of a method for sharing and accessing asset tracking information over a computer network such as the Internet. As described above, depending upon the identity of a user, various privileges and site accesses are provided, thereby changing the overall content of the site for different types of users. FIG. 4 depicts the inventive method for a user having the highest capabilities, thereby including all available options.

Referring now specifically to FIG. 4, the present embodiment includes additional options specifically relating to the synchronization process described above and available to website administrative level users. However, as above, upon entry of a URL associated with the web application area's website, a home page 400 is displayed to the administrative user. Again, several options are available to administrative users at this time. Prior to logging in to obtain access to user-specific asset information, administrative users may select a plurality of administrative pages, such as a help page 402, a sitemap 404, showing the layout of the website, a contact page 406 for facilitating communication with the website operators, and a feedback form 408 and associated submission page 410. From either the home page 400 or any of the administrative pages 402-410, administrative users may choose to login to the site. In response to this selection, a login form 412 is provided to the administrative user for receiving login information, such as, e.g., a username and password combination. Subsequently, the information is received and processed in the manner briefly described above to determine the level of site access the administrative user is afforded. If the login information is determined to be inaccurate, an appropriate error message page 414 prompting reentry of the information is displayed. Following entry of appropriate login information, a main menu 416 is displayed to the administrative user including several options including a synchronize option; a view reports option, a search by asset number or RFID tag number option, and a select project option.

Relating specifically to the synchronize option, administrative level users are provided with the authority to synchronize asset management information between the website and a remote client computer system in the manner set forth in detail above. In particular, by selecting the synchronize option from the main menu page 416, a synchronize select form 418 is displayed, wherein information regarding the information to be synchronized is submitted. This information should include at least a local file location for the XML file discussed above which is then uploaded to the website. Next, upon submission of a completed form 418, an electronic mail message 420 is generated which confirms the synchronization process.

Returning to the main menu 416, an administrative user may also select a view reports option. Selection of this option results in the display of a report menu page 422 which includes a listing of available reports, including an exception report and a maintenance report. If the user selects the exception report option, a create exception report page 424 is displayed and preferably includes options regarding the format and content of the generated exception report. Once selections have been made, the generated exception report is displayed to the user in page 426. Additional details regarding any exception listed in the report is then available in page 428.

If the user selects the maintenance report option, a create maintenance report page 430 is displayed and preferably also includes options regarding the format and content of the generated maintenance report. Maintenance reports are then generated to the various asset management information which has been collected regarding any required or suggested maintenance performed on any assets. Once selections have been made, the generated maintenance report is displayed to the user in page 432.

Returning to the main menu 416, the administrative user may also choose to view project or asset specific information in a variety of manners. Initially, the user may choose to simply input an asset identification number or RFID tag number and view the asset(s) associated with that number. In a preferred embodiment, this number may be entered directly on the main menu 416. Submission of this number then results in display of the corresponding assets in a variety of formats including a default format in page 434, a logistics format in page 436, a customer format in page 438 and a inventory format in page 440. Additionally, transition between any available format is easily made from any other format results. Once the asset search results have been displayed, users then have the ability to accept or reject a listed asset in page 442, view additional information regarding a selected asset in page 444, or export the search results to an external spreadsheet application in the desired format in pages 435, 437, 439 and 441, wherein each of these pages correspond to a selected search results format. Additional information regarding the content of asset receipt page 442 and asset details page 444 will be described in additional detail below.

Returning to the main menu 416, users can also search for asset management information by selecting an available project. Upon selection of this option, a listing of available projects is displayed in page 446. From this location, users may chose to view project-level detail information in page 448 including a listing of all assets associated with the selected project, search for assets included within the project in page 450 and display a listing of asset exceptions for a selected project in page 452. Turning specifically to page 448, once project-level detail information is displayed for a selected project, users have several options available for displaying additional information. Initially, they may choose to display the asset search page 450 for further narrowing the number of available assets, or the asset exception listing page 452 described above. Additionally, users have the option of selecting a particular asset or collection of assets and viewing this information in the various formats described in pages 434-440. Further, from the project details page 448, users also have the option of viewing project-level forecast information as well as status information for various units included in the project on page 453. Regarding the forecast information, upon selection of this option, a material list forecast page 454 is displayed which includes various forecast information relating to the number of assets are associated with the project, the size of the assets, etc. At this point, a selection to view asset-specific forecast information is also provided. Upon this selection, an asset forecast page 456 is displayed.

Returning to the asset search form in page 450, upon selection of this page from either the project select page or the project details page, information regarding the particular asset or assets requested is submitted. At this point, a decision to export information for all matching assets to an external spreadsheet application may be made in page 458. Otherwise, upon submission of the asset search form on page 450, resulting asset information is displayed in a variety of formats as set forth above regarding pages 434-440.

Returning now to page 442 relating to the receipt/rejection of assets, users at this point may choose to either confirm receipt of an asset in page 460 or enter an acceptance exception. If the asset is received without exception, the user is simply returned to the asset search results page (434-440). However, if an exception is to be entered, an asset exception annotation page 462 is displayed to the user. At this point, the user enters the exception information and submits the information in page 464. If the exception relates to a shortage in the received asset, a special circumstance is entered and a create asset shortage page 466 is displayed. Otherwise, the user is returned to the asset receipt page 442. If a shortage is created, additional information relating to the shortage is submitted in page 468 and the user may either return to the asset receipt form page 442 or, if the asset shortage is created after asset receipt, the user may proceed to the asset details page 444.

From the asset details page, users also have a variety of additional options, asset exceptions may be entered in page 462, assets may be received in page 442, asset location information may be modified or updated in page 472, asset storage maintenance details may be viewed in page 470, and asset packing list detail information may be viewed in page 474. Regarding the asset location page 470, upon display of this page, any modifications to the asset location are made and submitted in page 476. Regarding the asset storage maintenance details page 472, administrative users may also select to display and/or modify a maintenance log for the received asset. If so, a maintenance log page 480 is displayed showing the current status of the asset's maintenance log with options to create and or modify the displayed log. If log modification is desired, the user opens a modify maintenance log page 482 and submits any desired modifications. Similarly, if a new entry is to be created, the user selects a create option and opens a create maintenance log page 484, wherein information for the new entry is submitted.

Returning now to the asset exceptions listing page 452, users may select a listed exception and, for non-shortage exceptions, proceed to an asset exception details page 486. From this page, users may choose to resolve the selected asset exception. If so, a resolve asset exceptions page 478 is displayed. The user may then indicate that the exception has been resolved and return to the asset exception details page 486. For shortage exceptions, an asset shortage details page 488 is displayed. If the administrative user wishes to close the shortage, a close asset shortages page 490 is displayed., following the submission of which, the user is returned to the show asset exception list page 452.

By utilizing the collection of various interactive web pages described above, administrative users are easily able to update and view asset management information for every level of the website. Additionally, users are able to synchronize this data with data maintained on a remote client computer system.

By utilizing the collection of various interactive web pages described above, customer-side high level management users are easily able to view an appropriate level of asset management information. In accordance with the above described embodiment, the present invention provides a comprehensive system and method for maintaining and accessing asset management information in an easily implemented and updated manner. By facilitating both the collection and entry of asset management and tracking information as well as follow-up status and maintenance information, a current database of information can easily be maintained for subsequent review and utility.

Figure 5:
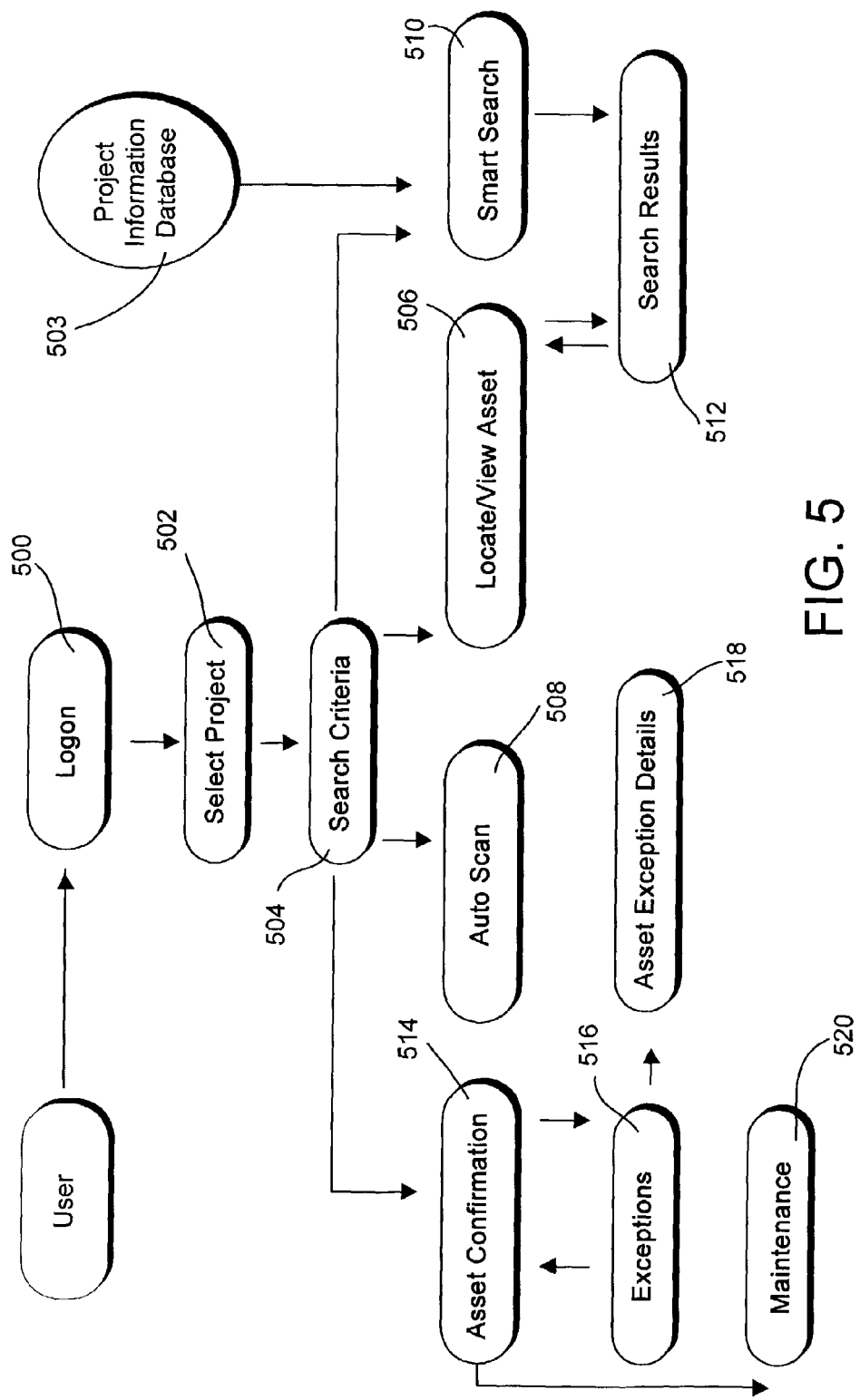
FIG. 5 is a flow diagram schematically illustrating one embodiment of a handheld device application for use with the present invention.

Referring now to FIG. 5, a flow diagram illustrates one a embodiment of the handheld device software application and its functionality as briefly described above in FIG. 2, above. As discussed, the handheld device 226 may be utilized to perform the same general functions described in FIGS. 3-4. Further, several additional functions may be performed only by the handheld device, such as asset or tag location and searching.

Initially, a device user logs in to the handheld device in step 500. It should be understood that for single user devices, this step may be omitted, however, where additional users are envisioned, step 500 may be utilized and set equal to a default user. Next, in step 502, the user selects a project for which information has been downloaded and synchronized (as described above). Although typically local device databases (such as that shown at element 503) are limited to either single projects or a small number of projects, depending upon the amount of memory included in the handheld device, the listing of available projects may be expanded to include all projects included in the system.

Upon project selection, the handheld device displays the number of assets in the project as well as a listing of available search/display options to the user. In step 504, the user may then select one of these options for obtaining and viewing information for individual assets or asset management devices. In the illustrated embodiment, the available search/display options include a asset confirmation option, an auto scan option, a locate/view case option, and a smart search option. As described in detail below, each of these options may be utilized independently to provide the user with a complete ability to monitor and manage all assets within the project.

Figure 6:
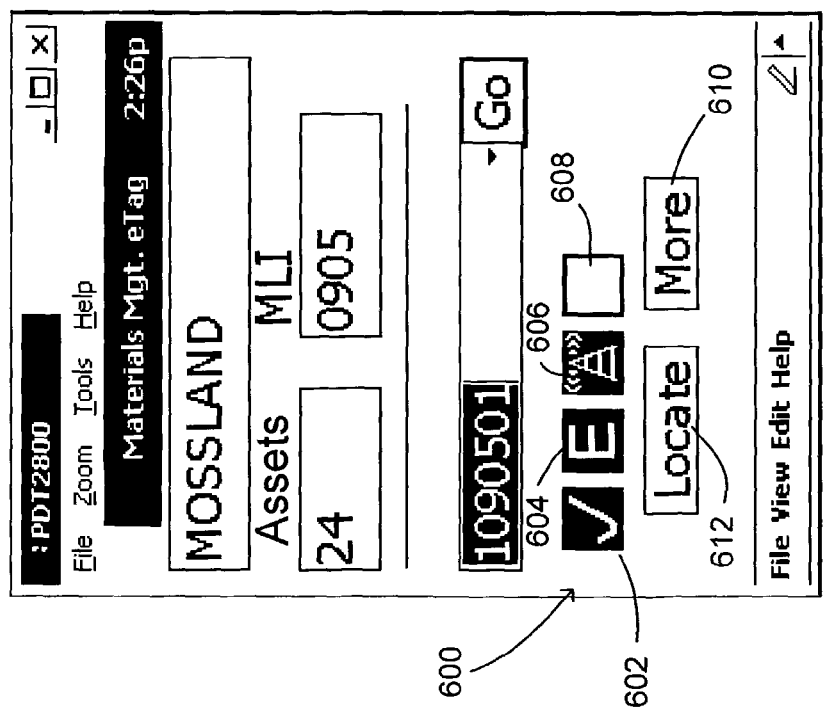
FIG. 6 is one embodiment of a handheld device asset information screen.

Referring specifically to the locate/view asset option, the user selects this option in step 506 by selecting a particular a particular asset included within a dropdown listing of assets associated with the selected project. In response, the handheld device displays an asset information screen, one embodiment of which is illustrated in FIG. 6. By viewing the asset information screen, the user is easily and quickly able to determine the present status of the status as well as its general location. Relating particularly to the embodiment illustrated in FIG. 6, a plurality of indicators 600 provide quick access to this information. The indicators preferably include an Asset Confirmed indicator 602, the presence of which indicates that receipt of the Asset has previously been confirmed, a Tag Attached indicator 604, indicating that the particular asset has an electronic tag attached thereto, a Tag Detected indicator 606, the presence of which indicates that a scan of the area has found the tag associated with the asset, and a Storage Location indicator 608, which indicates that the selected asset is located in storage. Additionally, additional information for the selected asset may also be viewed by selecting the More button 610.

In addition to enabling the viewing of asset status information, the locate/view asset option also enables the handheld user to locate the particular asset among a number of assets, potentially grouped together in a laydown yard or the like. Referring to the embodiment illustrated in FIG. 6, by selecting the Locate button 612, the handheld device searches the available area for the selected asset. If found, the handheld device will emit a sound, such as a beep, which increases in both frequency and volume as the user physically approaches the location of the selected asset. In this manner, the handheld device may be used to locate a specific asset in a crowded yard, potentially saving the user from manually going through each available asset.

Returning now to FIG. 5, users may also select an auto scan option from among the various search/display options available. Upon selection of this option in step 1008, the handheld device displays an autoscan screen, wherein the user selects or otherwise inputs an asset location area description, such as laydown yard or warehouse. The user then initiates the start of a scan, whereby the handheld device scans for asset identification tags within its range. As each tag is electronically detected the handheld device populates a list of tags that is displayed to the user. The user then walks around the entire asset location area leaving the handheld in the scanning mode.

Figure 7:
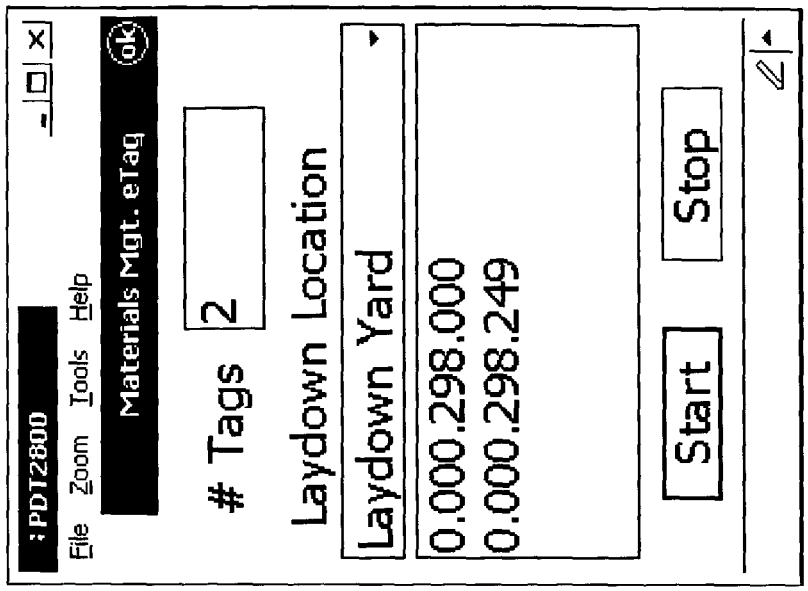
FIG. 7 is one embodiment of a handheld device auto scan results screen.

When the user has finished scanning the area, they stop the scanning process, whereby the handheld device then compares the list of tags detected with the internal database downloaded from the web application. If the handheld device finds a match between a detected tag and the tags in the database it will test to see if the asset has been previously scanned. If the tag has not been scanned previously it will update the internal database by 'timestamping' the tag with the date and time the tag was detected. Also, the handheld computer will update the detected tags location with the above selected asset location area if the database record does not have a previously assigned location area. However, if a tag is not on the internal database list it may store this in a separate file for later upload, since it may be that the identified asset includes either misassigned or misshipped material. In this manner, the auto scan feature enables a user to reduce the amount of time currently taken to inventory or catalog an asset location area using such electronic asset identification devices. Because individual electronic tags may be used to designate more than one asset, search results of the auto scan option may be provided by electronic tag number. Once tags have been identified, user may then select the associated tag number and view information regarding assets associated with the selected tag. One example of an auto scan results screen is shown in FIG. 7.

Figure 8:
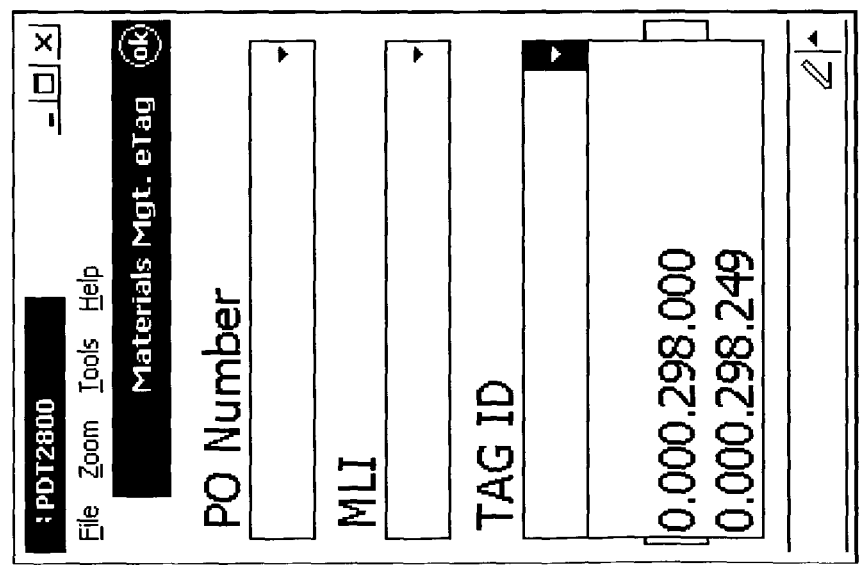
FIG. 8 is one embodiment of a handheld device smart search criteria screen.

Returning to FIG. 5, the user may also select the Smart Search option in step 510. By selecting this option, the user can enter various search criteria regarding a particular asset or group of assets and view and/or modify the results retrieved in step 512. Once embodiment of a smart search criteria screen is shown in FIG. 8 and includes search criteria of PO number, MLI number and tag number. Upon selection of information in any of these categories, the handheld device will perform a search for assets meeting these criteria. Once an asset has been identified, status and location information may be viewed and modified as set forth above.

Once an asset has been identified, either based upon specific knowledge or using one of the methods set forth above, users may select the case confirmation option in step 1014 to either confirm receipt of the asset or view/modify an earlier confirmation. Upon this selection, the handheld device presents the user with the ability to confirm receipt of the selected asset either with or without exceptions. Exceptions may be entered in step 516 and additional exception details may be entered in step 518. Additionally, as indicated above, the above steps may be similarly completed when reviewing or modifying a prior receipt and confirmation of an asset.

Figure 9:
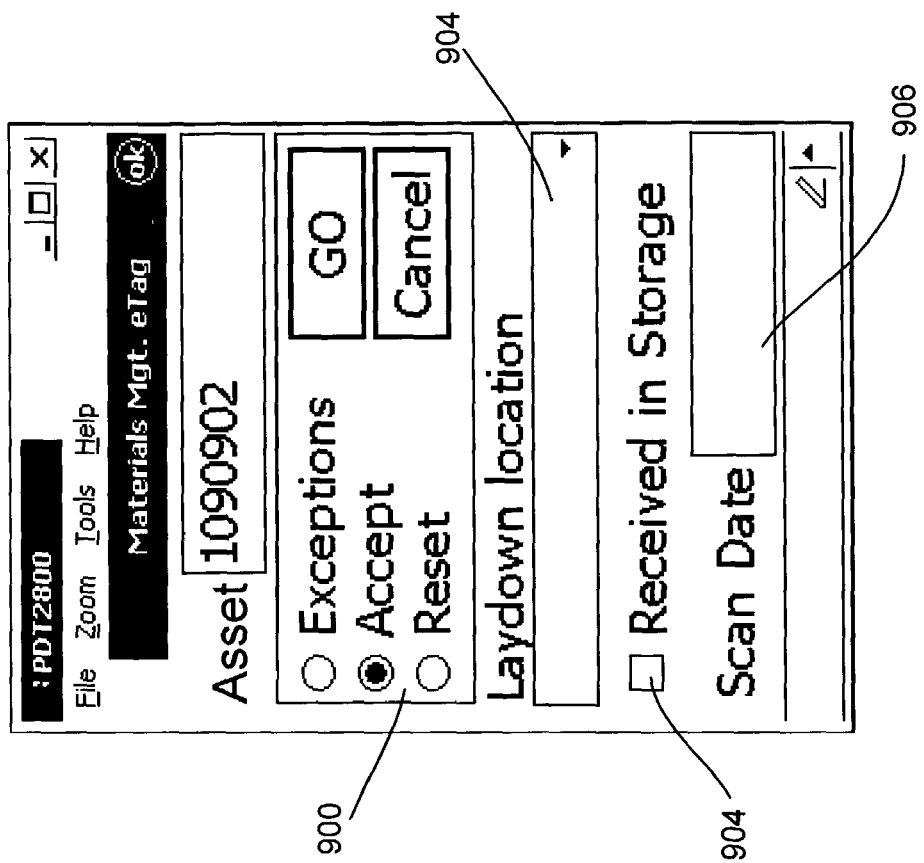
FIG. 9 is one embodiment of a handheld device asset confirmation screen.

Referring now to FIG. 9, there is illustrated one embodiment of an asset confirmation screen. As shown therein, users may indicate whether an asset is received with or without exceptions in area 900. Additionally, information relating to the assets location my be submitted in area 902, whether the asset has been received into storage may be received in area 904 and the date of the scan may be received in area 906. Additionally, if exceptions are being entered, an asset exception screen is presented wherein a general reason for the exception may be submitted, viewed or modified. Additionally, once a general reason is selected, an additional asset exception details page is displayed wherein details regarding the type and reason for the exception may be entered, viewed, or modified.

Returning now to FIG. 5, once an asset has been confirmed, information regarding the asset's maintenance requirements or maintenance status may be submitted or viewed by the user information in step 520. In this manner, upon completion of required maintenance tasks, users can easily modify the maintenance information for subsequent synchronization and upload to the asset management database.

In addition to providing data based upon specified search criteria, one embodiment of the present invention also includes the ability to limit the number of available assets based upon predefined criteria such as: all assets received; all assets not received; all assets confirmed; and all assets not confirmed. By providing this functionality it is even easier for users to directly drill down to the specific asset material they are searching for.

By providing a handheld device with the capability to receive and synchronize asset and project information from a centralized database and user field entry, the present invention better enables the accurate and up to date exchange of asset management information. Once assets are located and confirmed by users with the handheld device, this information is easily transmitted to the web application area and is subsequently available to the various users in the manner described in detail above. By providing users with the ability to enter information into a remote database on site via the handheld device, the accuracy of this information is substantially improved.

Figure 10:
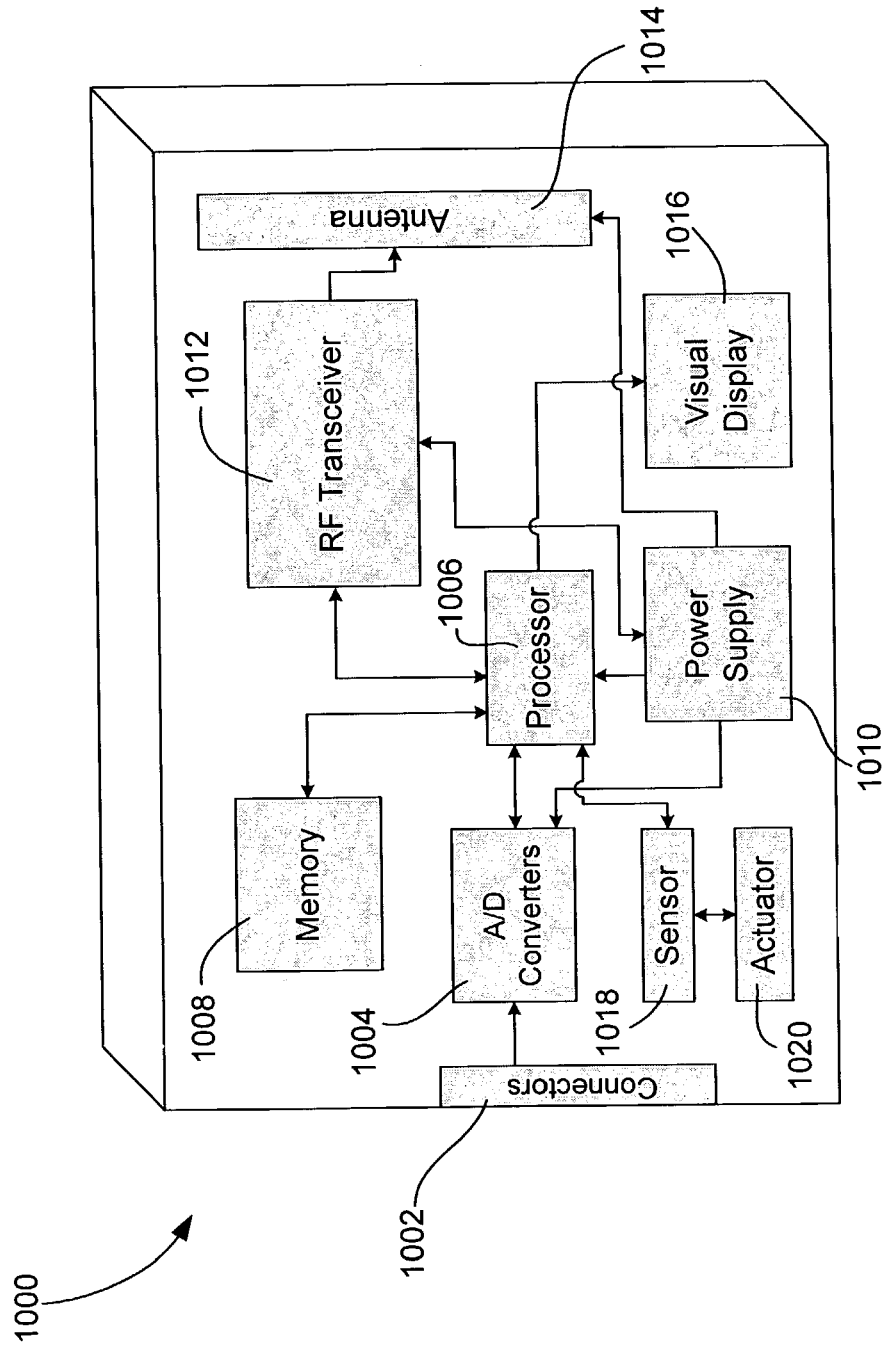
FIG. 10 is a block diagram illustrating one embodiment of an intelligent asset management device.

Although the above-described embodiments meet many asset management and tracking needs, the present invention provides additional utility through the inclusion of intelligent tracking, asset management and sensor devices that enable the storage and transmission of dynamic sensory information in addition to static information of the type described in detail above. Referring now to FIG. 10, there is shown a block diagram illustrating one embodiment of such an intelligent sensing device 1000 of the present invention. In particular, intelligent sensing device 1000 includes each of the following elements: a plurality of connectors 1002 for receiving external inputs; an analog to digital converter 1004 for converting received analog signals into digital signals; a processing unit 1006 for performing any signal processing required by the device; a memory 1008 operatively connected to the processor for storing information on the device; a power supply 1010 for providing required power to the processor and other elements; a radio frequency (RF) transceiver 1012 and antenna 1014 for enabling transmission and receipt of information wirelessly to other devices or readers; and a visual display 1016 for enabling the device to indicate current status or other information visually.

In addition to the above-described elements, the intelligent sensing device 1000 of the present invention also includes at least one sensor element 1018 and a corresponding actuator element 1020. In the manner more fully described below, sensor 1018 and actuator 1020 may be configured to provide additional information regarding the status and history of an asset's shipping and operating conditions. This information is then processed and stored in memory 1008 for subsequent transmission by the RF transceiver 1012. In this way, shipping conditions and asset status may be more accurately identified and maintained. The intelligent sensing device 1000 may be configured to include various types of sensors for monitoring and recording shipping and operating conditions, several of which are described below, thereby enabling users to learn about potential harmful or damaging conditions or any other breaches of operating guidelines.

In one example, an intelligent asset management device may include a collision sensor for maintaining a record of asset collisions. A vibration sensor may be utilized to monitor asset vibration. The asset management device then takes the monitored data and perform a vibration pattern analysis to more accurately determine asset condition. Speed sensors may be utilized to monitor the speed of an asset and maintain a record of this speed. Force/pressure sensors may be employed to monitor pressures placed on a sensor. The device then processes the pressure data and determines pressure trends and patterns. A tilt sensor may be employed to measure shipping and operation compliance with asset tilt guidelines. A tamper sensor may be employed to provide asset security and access control capabilities. A level sensor may be used to monitor levels or heights of materials during transit/operation. A weight sensors may be employed to provide wireless weighing of an asset for use by weigh stations. A photosensitive vision sensor may be used for tamper control or to monitor operating conditions. A GPS (global positioning satellite) sensor may be utilized to provide real-time geographic positioning information for an asset. Further, a chemical sensor may be employed to monitor asset exposure to specific chemicals or conditions such as moisture, smoke, carbon-monoxide, etc. Although various sensors have been described above, it should be understood that the present invention is in no way limited by this recitation. Rather, any suitable sensor may be implemented in accordance with the present invention.

By providing the above-described asset management devices with any combination of the above sensors, a more accurate indication of an assets location or operating conditions/history may be made available to system users in accordance with the methods described in detail above.

In addition to the inclusion of various sensors, the processing unit 1006 of asset management device 1000 may also be configured to include signal processing and decision making (SPDM) capabilities. In this manner, information received from the sensor units may be dynamically processed and stored in accordance with programming selections, rather than raw, unprocessed data which must be further processed upon receipt by a reading device. In one example, an asset management device equipped with a speed sensor may further be configured to process the monitored speeds such that only information concerning speeds over a certain threshold will be recorded for future retrieval. This ability to dynamically process received information greatly enhances the flow of relevant information between the asset management device and the end user receiving status information therefrom.

In addition, for asset management devices which perform broadcast functions (that is, they broadcast information without first receiving a explicit request), SPDM processing enables the device to perform such broadcasting only upon the presence of certain conditions. In this manner, a dynamic network of intelligent management devices may be maintained while still maintaining sufficient power supply to operate for an extended duration. Constant broadcast of information, conversely, would significantly increase the power needs of each device, thereby reducing the overall lifetime for such devices.

In accordance with one embodiment of the present invention, asset management device processors may also be configured to enable the devices to engage in device-to-device communication. By enabling the transceiver units to share information with other devices, as well as the handheld or stationary readers described above, information regarding asset location and status may be more readily available. Additionally, combining this feature with SPDM processing further results in a ubiquitous system of pervasive informatics, wherein information monitored and processed by one device may be shared among similarly situated devices which monitor different conditions.

An additional feature of the present invention is an intelligent asset management device having a low power requirement, thereby enabling extended operational use. In particular, power supply 1010 is, in one embodiment, a passive device which transmits information only when queried by a reading device or another asset management device and only over a short distance range e.g., 7-8 feet. Alternatively, the asset management devices of the present invention may be active devices which actively transmit information in response to predetermined conditions over extended distances, such as approximately 200 feet. For these embodiments, power supplies are more robust and may include such elements as photovoltaic films (e.g., solar films), or other condition responsive power sources. For a photovoltaic embodiment, a power supply having one film may sufficiently power the device for one week without additional light. Additional examples include power supplies driven by wind, pressure, motion, etc. By providing alternative power sources to conventional batteries, the lifetime and range of the asset management device may be further enhanced.

Figure 11:
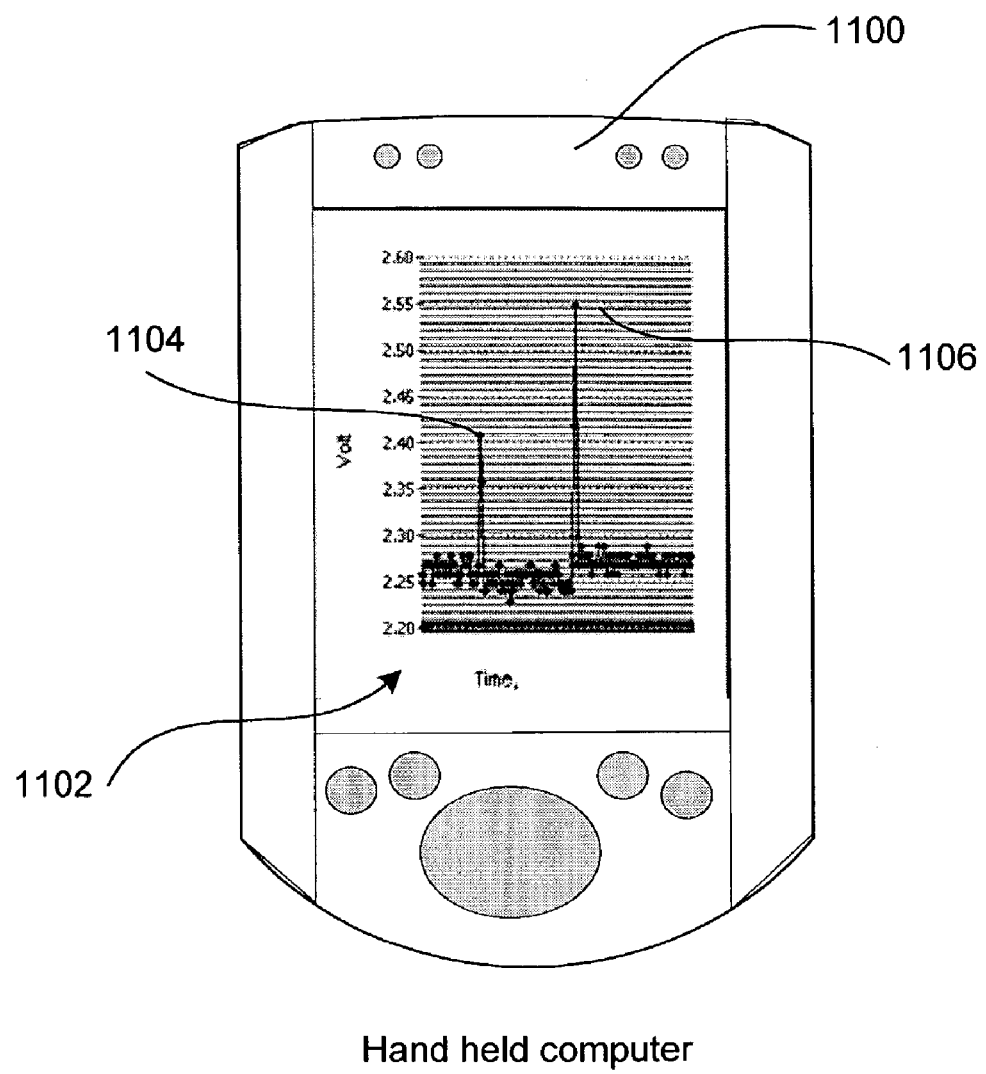
FIG. 11 is one embodiment of a handheld device's display screen configured to display sensor information received from an intelligent asset management device.

Referring now to FIG. 11, there is shown one embodiment of a graphical display 1102 for a handheld device 1100 of the present invention. In the present embodiment, an intelligent asset management device is configured to include an accelerometer sensor that may be used to record changes in acceleration undergone by the asset management device, and hence the asset it is mounted to. Changes in acceleration can indicate collisions and tilting or tipping over of the asset. Upon receipt of the asset in the manner described above, the handheld device can request and receive the data measured by the accelerometer. As shown in FIG. 11, the graphical display 1102 includes a graph of volts over time, with the significant changes in acceleration being denoted by large jumps 1104 and 1106 in the graph. These jumps indicate likely collisions or tilts to the asset.

Figure 12:
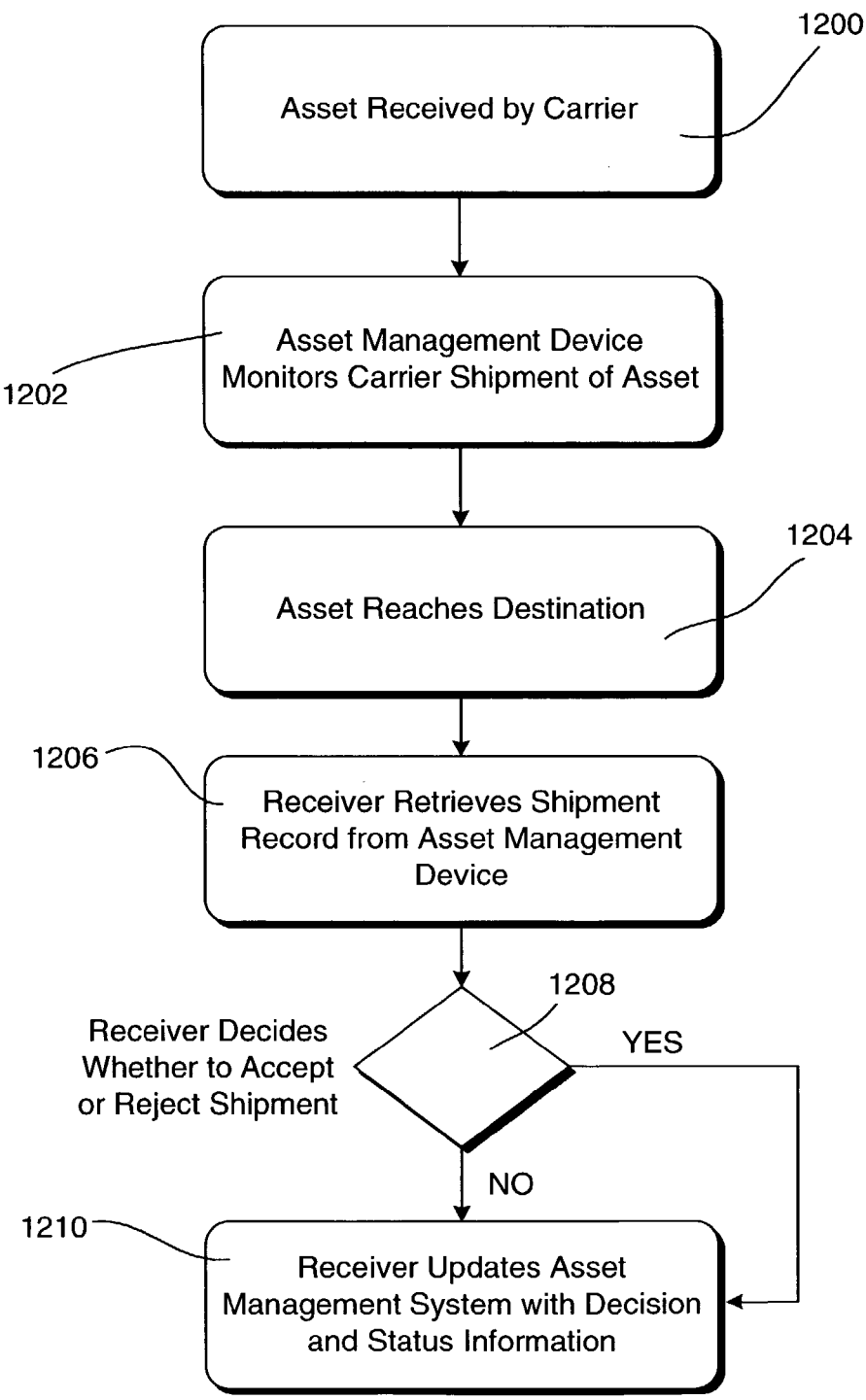
FIG. 12 is a flow diagram illustrating one embodiment of a method for receiving assets configured to include the intelligent asset management device of FIG. 10.

Referring now to FIG. 12, there is shown a flow diagram illustrating one embodiment of a method for receiving assets configured to include the intelligent asset management device of FIG. 10. In step 1200, the asset is received by a carrier for shipment to an end destination. Next, in step 1202, the attached asset management device operates to monitor the shipment process in accordance with the sensors incorporated into the device. As described above, these sensors may include force sensors, vibration sensors, collision sensors, or the like.

In step 1204, the asset is received at its destination in the manner set forth above in FIG. 4. Next, in step 1206, the receiver reviews the information collected by the asset management device during transit. In step 1208, it is determined, based upon the reviewed information, whether to accept or reject the asset. Once a decision has been made, the receiver updates the asset management system with the decision and any other status information regarding the asset in step 1210.

Figure 13:
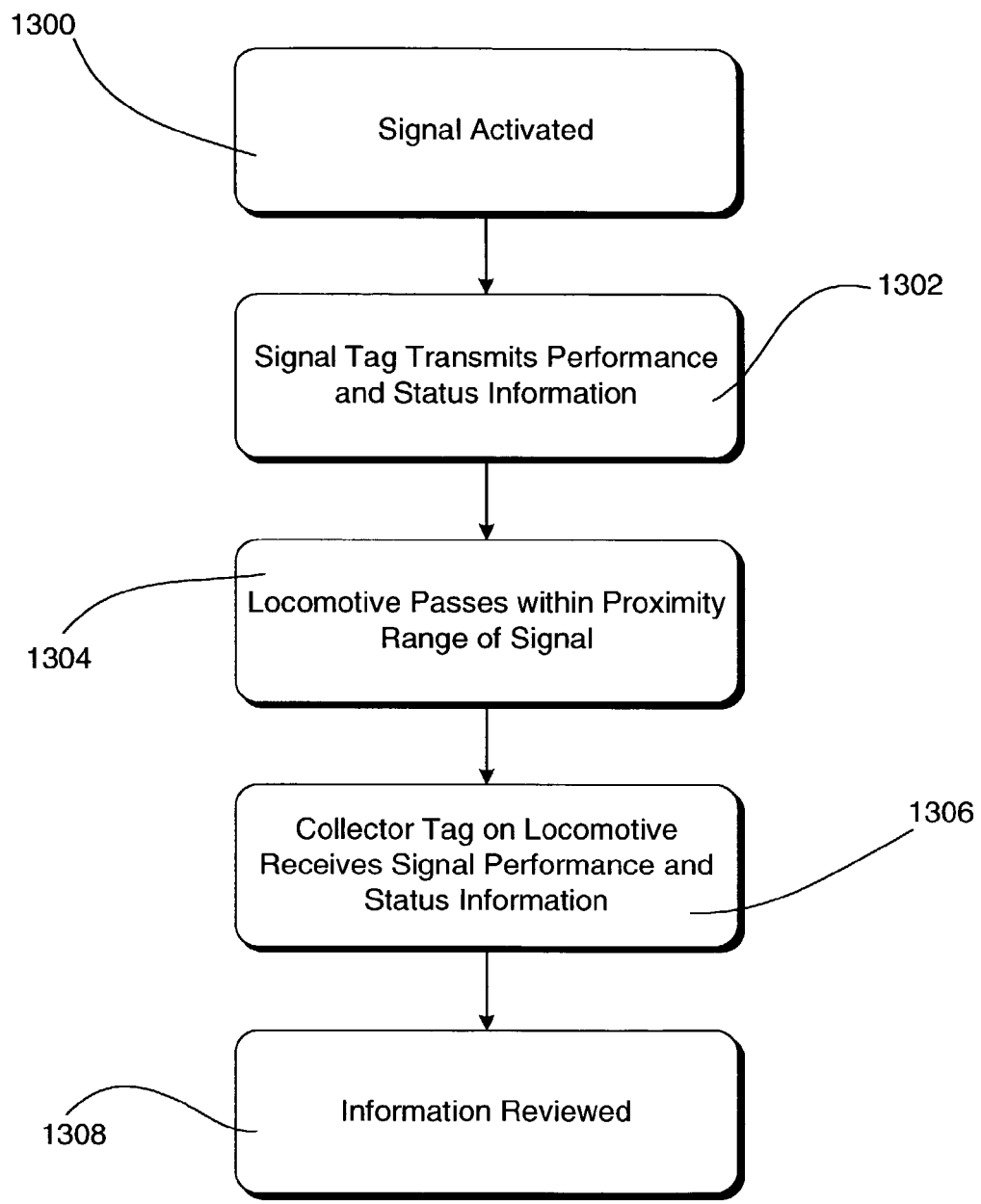
FIG. 13 is a flow diagram illustrating one embodiment of an alternative method for utilizing the intelligent asset management device of FIG. 10.

Referring now to FIG. 13, there is shown a flow diagram illustrating one embodiment of an alternative method for utilizing the intelligent asset management device of FIG. 10. In this embodiment, a plurality of asset management devices are configured to include coordinating sensors and collectors for enabling transmission of information wirelessly between multiple management devices. In one embodiment, the system may include at least one rail signal configured to include a signal sensor. In step 1300, the signal is activated. Next, in step 1302, the signal sensor device operates to transmit signal performance and status information, such as red, yellow, green, etc.

In accordance with the present embodiment, a locomotive transporting assets or individual assets within the locomotive are configured to include intelligent asset management devices having collectors thereon. In step 1304, the locomotive passes within a predetermined proximity of the rail signal sensor. In step 1306, the collector in receives the signal performance and status information transmitted from the signal sensor. In step 1308, this information may then be subsequently reviewed to determine the operation status of the signal light as well as its condition when the locomotive passed.

Figure 14:
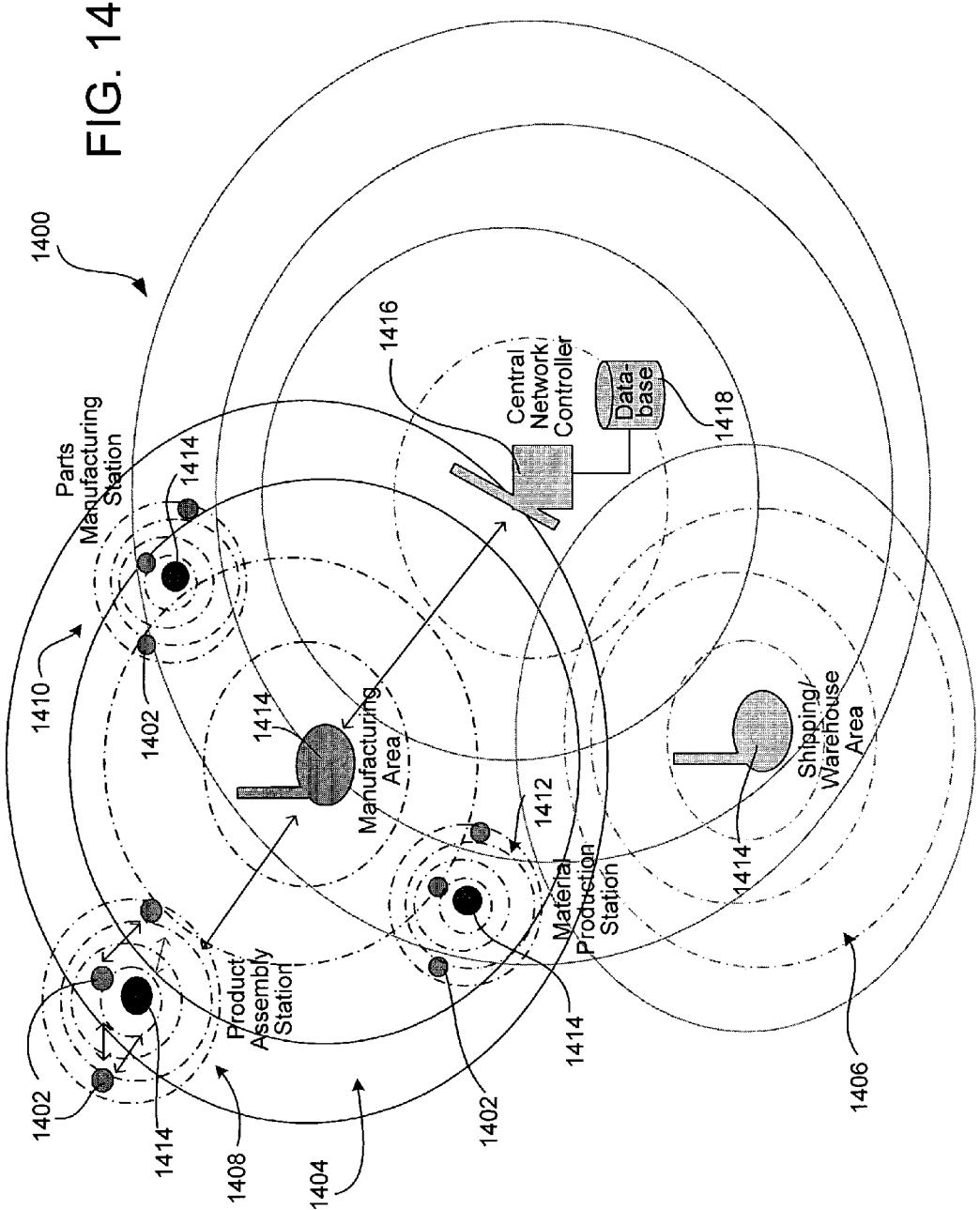
FIG. 14 is a network diagram illustrating one embodiment of an information network created by a plurality of asset management devices and readers configured in accordance with the present invention.

Referring now to FIG. 14, there is shown a network diagram illustrating one embodiment of an information network 1400 created by a plurality of asset management devices and readers configured in accordance with the present invention. In particular, network 1400 includes a plurality of asset management devices 1402 associated with particular operating environments. Such operating environments may include general environments such as at least one manufacturing environment 1404, and at least one shipping/warehouse environment 1406. Further each of these general environments may also be further broken down into sub-environments.

Referring specifically to the manufacturing environment, such sub-environments may include a parts manufacturing environment 1408, a material production station 1410, and a product assembly station 1412.

Additionally, each of the environments and sub-environments also include a station relay 1414 for processing received information and for coordinating the relay of signals from the various asset management devices 1402 between each other and between the various sub-environments. To facilitate the collection and subsequent dissemination of information between disparate locations, a central network controller 1416 is also provided for further extending the reach of network 1400. At least one database 1418 is also provided to enable storage and subsequent retrieval of the information created and monitored by the various connected asset management devices 1402.

By providing manufactured items with the intelligent asset management devices of the present invention, businesses are better enable to monitor the status and condition of these assets, thereby better serving the end customers. In accordance with network 1400, information regarding the status of any connected asset may be easily shared across multiple operating environments. Additionally, by utilizing asset management devices configured for two-way communications, updated information may be written to the devices from both local and remote sources.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A system for enabling enhanced asset management and tracking capabilities, comprising:
    a plurality of electronic asset identification and intelligent sensing devices, wherein each of the plurality of electronic asset identification devices and intelligent sensing devices are affixed to an asset whose location and information are to be managed, wherein each of the plurality of asset identification and intelligent sensing devices includes at least unique identification information relating to the asset to which it is affixed and at least one sensing element for monitoring environmental or operating conditions;
    an asset management server computer system for maintaining at least one database containing information regarding the asset identification and intelligent sensing devices and the assets to which they are affixed;
    a remote client computer system operatively connected to the asset management server computer system for exchanging information over a computer network;
    at least one interrogation device operatively connected to the remote client computer system, wherein the at least one interrogation device receives information from the plurality of asset identification and intelligent sensing devices and exchanges said information with the remote client computer system;
    wherein each of the electronic asset identification and intelligent sensing device further comprises a processing unit for processing the environmental or operating conditions and a transceiver unit to enable device-to-device communication between the plurality of electronic asset identification and intelligent sensing devices.

2. The system of claim 1, wherein the plurality of electronic asset management devices include radio frequency identification tags.

3. The system of claim 2, wherein the at least one interrogation device includes a fixed radio frequency identification tag reader.

4. The system of claim 2, wherein the at least one interrogation device includes a handheld radio frequency identification tag reader.

5. The system of claim 4, wherein the handheld radio frequency identification tag reader is a handheld computing device.

6. The system of claim 5, wherein the remote client computer system is the handheld computing device.

7. The system of claim 1, wherein the asset management server computer system further comprises:
    at least one web application server computer system for serving a plurality of interactive web pages relating to the asset identification and intelligent sensing devices and the assets to which they are affixed.

8. The system of claim 7, further comprising:
    at least one hypertext transfer protocol server computer system operatively connected to the web application server computer system; and
    at least one authentication server computer system operatively connected to the hypertext transfer protocol server for performing authentication and logon services, wherein the authentication server computer system is further operatively connected to an LDAP directory system for facilitating user login and authentication, wherein information exchanges initiated by the remote client computer system result in a first connection between the remote client computer system and the at least one authentication server computer system.

9. The system of claim 7, wherein the plurality of interactive web pages include:
    a home page;
    a login page for receiving user login information;
    a main menu page for displaying a plurality of options to users, selection of which a user to view and/or modify the asset management information maintained on the asset management web server computer system;
    a project details page for displaying general information regarding asset management information relating to a selected project;
    an asset search page for receiving asset search criteria from the user, the submission of which causes the asset management web server computer system to retrieve asset management information matching the submitted search criteria;
    an asset search results page for displaying the retrieved asset management information; and
    an asset details page for displaying specific asset management information relating to a selected one of the assets displayed on the asst search results page.

10. The system of claim 1, wherein the remote client computer system is a laptop or notebook style computer system.

11. The system of claim 1, wherein information is synchronized between the at least one interrogation device and the remote client computer system, such that changes to the information made on the at least one interrogation device are translated to the information maintained on the remote client computer system.

12. The system of claim 11, wherein information is synchronized between the remote computer system and the asset management server computer system, such that changes to the information made on the remote client computer system are translated to the information maintained on the asset management server computer system.

13. The system of claim 1, further comprising additional remote client computer systems operatively connected to the asset management server computer system for enabling users to access and modify information contained on the asset management computer system.

14. The system of claim 1, wherein the at least one interrogation device further comprises:
 a computer software application resident thereon, wherein the computer software application incorporates one or more instructions for wirelessly determining the presence of a plurality of electronic asset identification and intelligent sensing devices.

15. The system of claim 14, wherein the computer software application further comprises:
 one or more instructions for determining whether a selected electronic asset identification and intelligent sensing device is within a range of the interrogation device;
 one or more instructions for indicating the presence of the selected electronic asset identification and intelligent sensing device to the user; and
 one or more instructions for enhancing the indication of the presence of the selected electronic asset identification and intelligent sensing device upon increasing proximity to the selected electronic asset identification device.

16. The system of claim 14, wherein the computer software application further comprises:
 one or more instructions for displaying asset management and monitored environmental or operating conditions information regarding a selected asset, wherein the asset management and monitored environmental or operating conditions information includes an indication regarding whether the selected asset has been confirmed;
 an indication that the selected asset has an electronic asset identification and intelligent sensing device affixed thereto;
 an indication regarding the presence of the affixed electronic asset identification and intelligent sensing device;
 an indication regarding the storage status of the selected asset; and
 a graphical display of the monitored environmental or operating conditions information.

17. The system of claim 14, wherein the computer software application further comprises:
 one or more instructions for receiving an asset location area description;
 one or more instructions for scanning the asset location area to identify the presence therein of electronic asset identification devices; and
 one or more instructions for determining whether identified electronic asset identification devices correspond to information received from the asset management server computer system.

18. The system of claim 14, wherein the computer software application further comprises:
 one or more instructions for synchronizing local asset management and monitored environmental or operating conditions information with asset management and monitored environmental or operating conditions information received from the asset management server computer system for a selected group of assets.

19. The system of claim 14, wherein the computer software application further comprises:
 one or more instructions for receiving a user confirmation that a selected asset has been received; and
 one or more instructions for receiving exception information relating to the selected asset.

20. The system of claim 14, wherein the computer software application further comprises:
 one or more instructions for receiving an indication from the user that a selected asset has been rejected in view of received monitored environmental or operating conditions information.

21. A method for enabling enhanced asset management and tracking capabilities, comprising:
 affixing a plurality of electronic asset identification and intelligent sensing devices to an asset whose location and information are to be managed, wherein each of the plurality of electronic asset identification and intelligent sensing devices includes at least one sensor element for monitoring environmental or operating conditions, a processing unit operatively connected to the sensor element for processing the environmental or operating conditions, a power supply operatively connected to the processing unit, a memory operatively connected to the processing unit and the power supply, a radio frequency transceiver operatively connected to the processing unit and the power supply and configured to enable device-to-device communication between the plurality of electronic asset identification and intelligent sensing devices, and an antenna operatively connected to the radio frequency transceiver and the power supply;
 programming each of the plurality of asset identification and intelligent sensing devices to include at least unique identification information relating to the asset to which it is affixed;
 programming each of the plurality of asset identification and intelligent sensing devices to monitor and store selected environmental or operating conditions;
 maintaining at least one database containing information regarding the asset identification and intelligent sensing devices and the assets to which they are affixed on an asset management server computer system;
 operatively connecting a remote client computer system to the asset management server computer system for exchanging information over a computer network; and
 operatively connecting at least one interrogation device to the remote client computer system, wherein the at least one interrogation device receives information from the plurality of asset identification and intelligent sensing devices and exchanges said information with the remote client computer system.

22. The method of claim 21, wherein the at least one interrogation device includes a fixed radio frequency identification tag reader.

23. The method of claim 21, wherein the at least one interrogation device includes a handheld radio frequency identification tag reader.

24. The method of claim 23, wherein the handheld radio frequency identification tag reader is a handheld computing device.

25. The method of claim 21, wherein the step maintaining at least one database on an asset management server computer system further comprises:
 serving a plurality of interactive web pages relating to the asset identification and intelligent sensing devices and the assets to which they are affixed from at least one web application server computer system.

26. The method of claim 25, wherein the step of serving a plurality of interactive web pages further comprises the steps of:
 displaying a home page; displaying a login page for receiving user login information;
 displaying a main menu page for displaying a plurality of options to users, selection of which a user to view and/or modify the asset management information maintained on the asset management web server computer system;

displaying a project details page for displaying general information regarding asset management information relating to a selected project;

displaying an asset search page for receiving asset search criteria from the user, the submission of which causes the asset management web server computer system to retrieve asset management information matching the submitted search criteria;

displaying an asset search results page for displaying the retrieved asset management information; and displaying an asset details page for displaying specific asset management information relating to a selected one of the assets displayed on the asst search results page.

27. The method of claim 26, further comprising:

operatively connection at least one authentication server computer system to the web application server computer system for facilitating user login and authentication, wherein the web server application serves different web pages depending upon login information received from the remote client computer system.

28. The method of claim 27, further comprising the steps of:

receiving administrative level user login information;

displaying a show report menu page for enabling users to select and create reports of available asset management information;

displaying a synchronize web page for receiving file information for a file to be synchronized;

displaying an asset receipt form web page for receiving a user indication regarding receipt of an asset;

displaying an asset exception annotation web page for receiving information regarding an exception to be added to a selected asset;

displaying an asset exception list page for displaying a listing of asset management exceptions associated with a selected project; and displaying a resolve asset exception web page, wherein users may indicate that a selected exception has been resolved.

29. The method of claim 21, wherein the remote client computer system is a laptop or notebook style computer system.

30. The method of claim 21, further comprising the step of:

synchronizing information between the at least one interrogation device and the remote client computer system, such that changes to the information made on the at least one interrogation device are translated to the information maintained on the remote client computer system.

31. The method of claim 30, further comprising the step of:

synchronizing information between the remote computer system and the asset management server computer system, such that changes to the information made on the remote client computer system are translated to the information maintained on the asset management server computer system.

32. The method of claim 21, further comprising the step of:

operatively connecting additional remote client computer systems to the asset management server computer system for enabling users to access and modify information contained on the asset management computer system.

33. The method of claim 32, wherein users operating the additional remote client computer systems are provided specialized access depending upon login information received by the asset management server computer system.

34. The method of claim 21, further comprising the step of wirelessly determining, by a computer software application resident on the at least one interrogation device, the presence of a plurality of electronic asset identification and intelligent sensing devices.

35. The method of claim 34, wherein the computer software application further performs the steps of:

determining whether a selected electronic asset identification device is within a range of the interrogation device;

indicating the presence of the selected electronic asset identification device to the user; and enhancing the indication of the presence of the selected electronic asset identification device upon increasing proximity to the selected electronic asset identification device.

36. The method of claim 34, wherein the computer software application further performs the step of:

displaying asset management and monitored environmental or operating conditions information regarding a selected asset, wherein the asset management and monitored environmental or operating conditions information includes an indication regarding whether the selected asset has been confirmed;

an indication that the selected asset has an electronic asset identification and intelligent sensing device affixed thereto;

an indication regarding the presence of the affixed electronic asset identification and intelligent sensing device;

an indication regarding the storage status of the selected asset; and a graphical display of the monitored environmental or operating conditions information.

37. The method of claim 34, wherein the computer software application further performs the steps of:

receiving an asset location area description;

scanning the asset location area to identify the presence therein of electronic asset identification and intelligent sensing devices; and determining whether identified electronic asset identification and intelligent sensing devices correspond to information received from the asset management server computer system.

38. The method of claim 34, wherein the computer software application further performs the step of:

synchronizing local asset management and monitored environmental or operating conditions information with asset management and monitored environmental or operating conditions information received from the asset management server computer system for a selected group of assets.

39. The method of claim 34, wherein the computer software application further performs the steps of:

receiving a user confirmation that a selected asset has been received; and receiving exception information relating to the selected asset.

40. The system of claim 34, wherein the computer software application further performs the steps of:

receiving an indication from the user that a selected asset has been rejected in view of received monitored environmental or operating conditions information.

41. The system of claim 1, wherein the unique identification information comprises an electronic identification code.

42. The system of claim 41, wherein the electronic identification code is alphanumeric in character.

* * * * *